United States Patent
Weng et al.

(10) Patent No.: US 11,778,338 B2
(45) Date of Patent: Oct. 3, 2023

(54) IMAGE PROCESSING AND PRESENTATION

(71) Applicant: SZ DJI TECHNOLOGY CO., LTD., Shenzhen (CN)

(72) Inventors: Chao Weng, Shenzhen (CN); Hongjing Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/646,079

(22) Filed: Dec. 27, 2021

(65) Prior Publication Data
US 2022/0124246 A1    Apr. 21, 2022

Related U.S. Application Data

(63) Continuation of application No. 16/870,225, filed on May 8, 2020, now Pat. No. 11,212,436, which is a (Continued)

(51) Int. Cl.
*H04N 23/951* (2023.01)
*G06T 7/13* (2017.01)
(Continued)

(52) U.S. Cl.
CPC ............ *H04N 23/951* (2023.01); *G06T 7/13* (2017.01); *G06T 7/337* (2017.01); *H04N 5/2628* (2013.01); *H04N 5/272* (2013.01)

(58) Field of Classification Search
USPC .................. 382/284, 294, 298, 199; 345/660
See application file for complete search history.

(56) References Cited

U.S. PATENT DOCUMENTS

| 4,528,693 A | 7/1985 | Pearson et al. |
| 6,400,852 B1 | 6/2002 | Miller et al. |
| (Continued) | | |

FOREIGN PATENT DOCUMENTS

| CN | 1791199 A | 6/2006 |
| CN | 101165538 A | 4/2008 |
| (Continued) | | |

OTHER PUBLICATIONS

The World Intellectual Property Organization (WIPO) International Search Report for PCT/CN2018/102493 dated Apr. 30, 2019 7 Pages.

*Primary Examiner* — Kathleen Y Dulaney
(74) *Attorney, Agent, or Firm* — ANOVA LAW GROUP, PLLC

(57) ABSTRACT

An image presentation method includes obtaining a first image and a second image having same contents; size-processing the first image according to at least one of a target resolution, an aspect ratio of the first image, or an aspect ratio of the second image to generate a size-processed first image having the target resolution; generating a presenting image at least by combining the size-processed first image and the second image; and encoding the presenting image in a code stream and transmitting the encoded image to the display device that requires the preset resolution for display. The first and second images include a visible-light image and an infrared image. The presenting image has a preset resolution no less than a sum of the target resolution and a resolution of the second image. The size-processed first image and the second image are arranged in the presenting image without partially blocking each other.

18 Claims, 11 Drawing Sheets

Related U.S. Application Data continuation of application No. PCT/CN2018/102493, filed on Aug. 27, 2018.

(51) Int. Cl.
*G06T 7/33* (2017.01)
*H04N 5/262* (2006.01)
*H04N 5/272* (2006.01)

(56) References Cited

U.S. PATENT DOCUMENTS

| | | |
|---|---|---|
| 7,138,905 B2 | 11/2006 | Pavlidis et al. |
| 7,965,314 B1 | 6/2011 | Miller et al. |
| 8,050,519 B2 | 11/2011 | Katsumata et al. |
| 8,116,593 B2 | 2/2012 | Kondo et al. |
| 8,472,753 B2 | 6/2013 | Bucha et al. |
| 8,614,747 B2 | 12/2013 | Alt et al. |
| 8,644,620 B1 | 2/2014 | Lam |
| 8,983,151 B2 | 3/2015 | Park et al. |
| 10,044,946 B2* | 8/2018 | Strandemar ............ H04N 5/272 |
| 10,148,895 B2* | 12/2018 | Jönsson ............... H04N 5/2622 |
| 10,191,153 B2 | 1/2019 | Gatland |
| 2002/0047851 A1* | 4/2002 | Hirase ............... H04N 5/44504 |
| | | 345/660 |
| 2002/0090124 A1 | 7/2002 | Soubelet et al. |
| 2003/0039405 A1 | 2/2003 | Oosawa |
| 2004/0223058 A1* | 11/2004 | Richter ............. H04N 21/2383 |
| | | 348/207.1 |
| 2005/0041871 A1 | 2/2005 | Abe |
| 2005/0093886 A1* | 5/2005 | Kubota ................ H04N 1/3872 |
| | | 345/619 |
| 2005/0271300 A1 | 12/2005 | Pina |
| 2007/0019104 A1 | 1/2007 | Inoue et al. |
| 2007/0146392 A1 | 6/2007 | Feldman et al. |
| 2009/0079852 A1 | 3/2009 | Kojima |
| 2011/0063407 A1* | 3/2011 | Wang .................. H04N 21/454 |
| | | 348/E7.083 |
| 2011/0122251 A1 | 5/2011 | Schmidt |
| 2011/0234640 A1* | 9/2011 | Ishida ................. H04N 23/611 |
| | | 345/671 |
| 2012/0105657 A1* | 5/2012 | Yokohata ................ G06T 11/60 |
| | | 348/208.4 |
| 2012/0262584 A1* | 10/2012 | Strandemar ............ G06T 5/003 |
| | | 382/284 |
| 2012/0287222 A1* | 11/2012 | Liu ...................... H04N 23/698 |
| | | 348/14.07 |
| 2013/0050453 A1* | 2/2013 | Bergstrom ............. G01J 5/025 |
| | | 348/61 |
| 2013/0230211 A1 | 9/2013 | Tanabiki et al. |
| 2013/0265322 A1* | 10/2013 | Tsujimoto ............ G02B 21/365 |
| | | 345/589 |
| 2013/0285887 A1 | 10/2013 | Sako et al. |
| 2013/0300875 A1 | 11/2013 | Strandemar et al. |
| 2014/0003741 A1 | 1/2014 | Cui et al. |
| 2014/0240512 A1 | 8/2014 | Högasten et al. |
| 2015/0055886 A1 | 2/2015 | Oh et al. |
| 2015/0109454 A1 | 4/2015 | Strandemar et al. |
| 2015/0288892 A1 | 10/2015 | Frank et al. |
| 2015/0296146 A1 | 10/2015 | Scanlon et al. |
| 2015/0365629 A1* | 12/2015 | Williams ................ H04N 1/387 |
| | | 348/14.13 |
| 2016/0073043 A1 | 3/2016 | Stork et al. |
| 2016/0104509 A1 | 4/2016 | Loscalzo |
| 2016/0117092 A1 | 4/2016 | Wang et al. |
| 2016/0196653 A1 | 7/2016 | Grant et al. |
| 2016/0344996 A1 | 11/2016 | Olilla |
| 2017/0024856 A1 | 1/2017 | Kajimura |
| 2017/0039411 A1 | 2/2017 | Ono |
| 2017/0061663 A1* | 3/2017 | Johnson ................. H04N 23/11 |
| 2017/0116725 A1* | 4/2017 | Stuart ....................... G06T 7/30 |
| 2017/0206642 A1* | 7/2017 | Rhead ...................... G06T 7/11 |
| 2017/0287190 A1* | 10/2017 | Lin ............................ G06T 5/20 |
| 2018/0270448 A1* | 9/2018 | Onuma ..................... H04N 7/18 |
| 2018/0332207 A1 | 11/2018 | Yamamoto et al. |
| 2018/0367744 A1 | 12/2018 | Ozone |
| 2020/0045247 A1 | 2/2020 | Okamoto et al. |
| 2020/0053297 A1 | 2/2020 | Tokizaki et al. |

FOREIGN PATENT DOCUMENTS

| | | |
|---|---|---|
| CN | 201854353 U | 6/2011 |
| CN | 102567978 A | 7/2012 |
| CN | 104364800 A | 2/2015 |
| CN | 104427245 A | 3/2015 |
| CN | 104601953 A | 5/2015 |
| CN | 104662891 A | 5/2015 |
| CN | 105009568 A | 10/2015 |
| CN | 106500852 A | 3/2017 |
| CN | 108053386 A | 5/2018 |
| CN | 108090888 A | 5/2018 |
| CN | 108476295 A | 8/2018 |
| EP | 1182870 A1 | 2/2002 |
| EP | 1914998 A2 | 4/2008 |
| JP | 2006229585 A | 8/2006 |
| WO | 2013144298 A1 | 10/2013 |
| WO | 2017052766 A1 | 3/2017 |
| WO | 2017123824 A1 | 7/2017 |

* cited by examiner

IMAGE PROCESSING AND PRESENTATION

CROSS-REFERENCE TO RELATED APPLICATIONS

This application is a continuation of U.S. application Ser. No. 16/870,225, filed on May 8, 2020, which is a continuation of International Application PCT/CN2018/102493, filed Aug. 27, 2018, the entire contents of both of which are incorporated herein by reference.

TECHNICAL FIELD

The present disclosure relates to image processing and, more particularly, to an image presentation method, an image processing method, an image acquisition apparatus, and a terminal device.

BACKGROUND

With rapid development of photographing technologies, the demand for image acquisition apparatuses with more functions is increasing. At present, a camera can be equipped with both infrared image sensing and visible light sensors. A user can select different sensors to take photos and obtain an infrared image or a visible-light image. For a same photographing scene, the user can select to use both image sensors for photographing to obtain both the visible-light image and the infrared image. The camera usually respectively displays two captured images of the photographing scene to the user.

To facilitate the user to preview and compare the visible-light image and the infrared image, the infrared image captured by the infrared image sensor and the visible-light image captured by the visible-light image sensor may be fused into one image and then displayed to the user. However, a resolution of the infrared image is usually lower than a resolution of the visible-light image. In addition, a resolution of an image obtained by simply combining the two captured images (i.e., the visible-light image and the infrared image) does not meet a resolution requirement of an image that can be directly decoded by a general terminal device for image presentation. Therefore, the terminal device cannot directly decode a code stream of the simply combined image, and the simply combined image cannot be presented to the user, resulting in poor user experience.

SUMMARY

In accordance with the disclosure, there is provided an image presentation method including obtaining a first image captured by a first image sensor and a second image captured by a second image sensor, size-processing the first image according to at least one of a target resolution, an aspect ratio of the first image, or an aspect ratio of the second image to generate a size-processed first image having the target resolution, and generating a presenting image at least by combining the size-processed first image and the second image. The presenting image has a preset resolution that is not less than a sum of the target resolution and a resolution of the second image.

Also in accordance with the disclosure, there is provided an image presentation method including obtaining a first image captured by a first image sensor and a second image captured by a second image sensor, and size-processing the first image to generate a size-processed first image. A displaying size of a target object in the size-processed first image is equal to a displaying size of the target object in the second image. The method further includes determining a matching region of one of the size-processed first image and the second image that matches a central region of another one of the size-processed first image and the second image, and generating a presenting image at least by superimposing the matching region of the one of the size-processed first image and the second image on the central region of the other one of the size-processed first image and the second image.

Also in accordance with the disclosure, there is provided an image acquisition apparatus including a first image sensor configured to capture a first image, a second image sensor configured to capture a second image, a processor coupled to the first image sensor and the second image sensor, and a memory coupled to the processor and storing instructions. When the instructions are executed by the processor, the instructions cause the processor to obtain the first image and the second image, size-process the first image according to at least one of a target resolution, an aspect ratio of the first image, or an aspect ratio of the second image to generate a size-processed first image having the target resolution, and generate a presenting image at least by combining the size-processed first image and the second image. The presenting image has a preset resolution that is not less than a sum of the target resolution and a resolution of the second image.

Also in accordance with the disclosure, there is provided a terminal device including a processor, and a memory coupled to the processor and storing instructions. When the instructions are executed by the processor, the instructions cause the processor to obtain a first image and a second image, size-process the first image according to at least one of a target resolution, an aspect ratio of the first image, or an aspect ratio of the second image to generate a size-processed first image having the target resolution, and generate a presenting image at least by combining the size-processed first image and the second image. The presenting image has a preset resolution that is not less than a sum of the target resolution and a resolution of the second image.

Also in accordance with the disclosure, there is provided an image acquisition apparatus including a first image sensor configured to capture a first image, a second image sensor configured to capture a second image, a processor coupled to the first image sensor and the second image sensor, and a memory coupled to the processor and storing instructions. When the instructions are executed by the processor, the instructions cause the processor to obtain the first image and the second image, and size-process the first image to generate a size-processed first image. A displaying size of a target object in the size-processed first image is equal to a displaying size of the target object in the second image. The instructions further cause the processor to determine a matching region of one of the size-processed first image and the second image that matches a central region of another one of the size-processed first image and the second image, and generate a presenting image at least by superimposing the matching region of the one of the size-processed first image and the second image on the central region of the other one of the size-processed first image and the second image.

Also in accordance with the disclosure, there is provided a terminal device including a processor, and a memory coupled to the processor and storing instructions. When the instructions are executed by the processor, the instructions cause the processor to obtain a first image and a second image, and size-process the first image to generate a size-processed first image. A displaying size of a target object in the size-processed first image is equal to a displaying size of the target object in the second image. The instructions further cause the processor to determine a matching region of one of the size-processed first image and the second image that matches a central region of another one of the size-processed first image and the second image, and generate a presenting image at least by superimposing the matching region of the one of the size-processed first image and the second image on the central region of the other one of the size-processed first image and the second image.

Also in accordance with the disclosure, there is provided an image processing method including obtaining a first image and a second image including a same image feature, obtaining a control instruction for fusing the first image and the second image, fusing the first image and the second image according to the control instruction to obtain a fused image, and displaying the fused image. The image feature is displayed in each of two separate parts of the fused image that correspond to the first image and the second image, respectively, or the image feature in the first image and the image feature in the second image are superimposed on each other and displayed in a superimposed part of the fused image.

Also in accordance with the disclosure, there is provided a terminal device including a processor, and a memory coupled to the processor and storing instructions. When the instructions are executed by the processor, the processor is configured to obtain a first image and a second image including a same image feature, obtain a control instruction for fusing the first image and the second image, and fuse the first image and the second image according to the control instruction to obtain a fused image. The terminal device further includes a display coupled to the processor and configured to display the fused image. The image feature is displayed in each of two separate parts of the fused image that correspond to the first image and the second image, respectively, or the image feature in the first image and the image feature in the second image are superimposed on each other and displayed in a superimposed part of the fused image.

DETAILED DESCRIPTION

Figure 1:
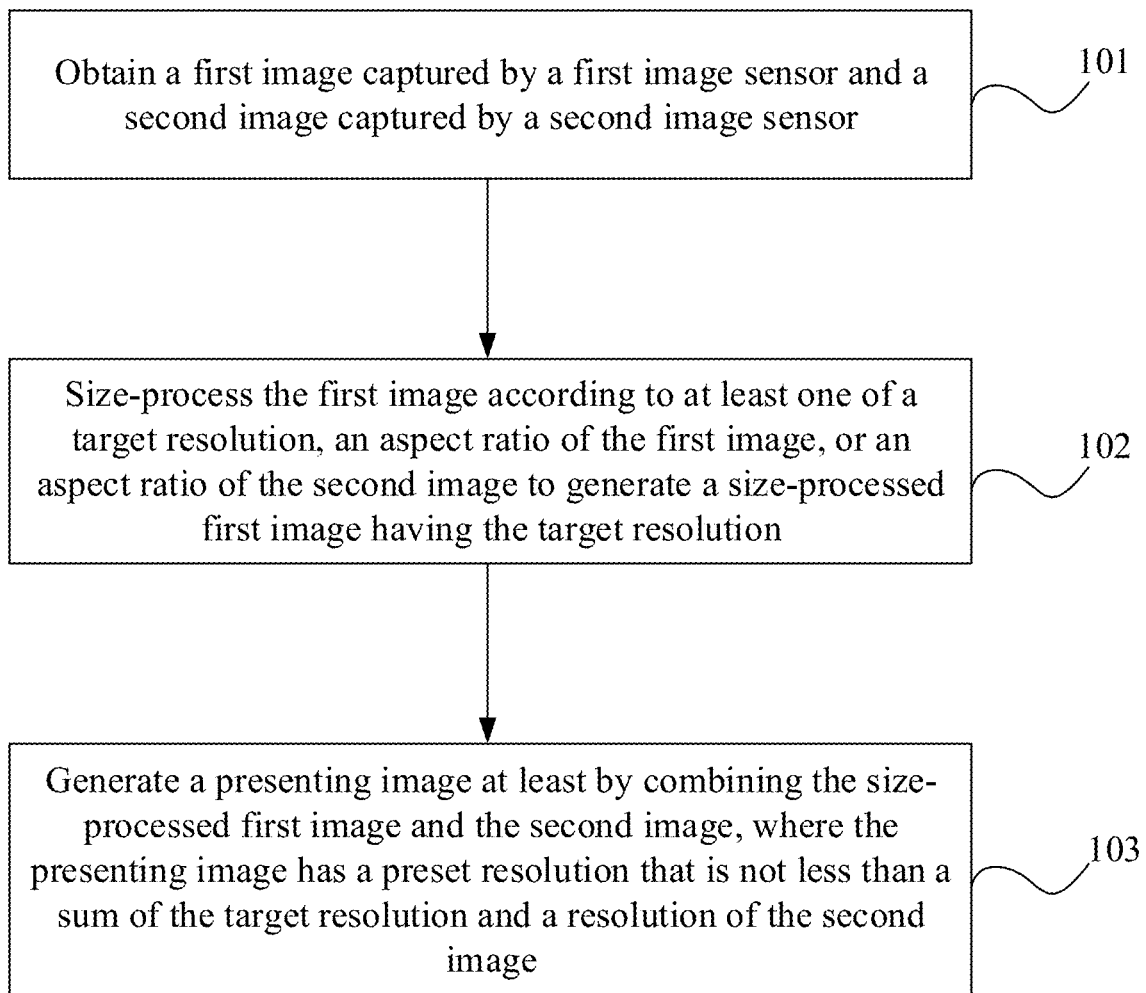
FIG. 1 is a flow chat of an image presentation method according to some embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

With a rapid development of image acquisition technologies, the image acquisition apparatus, e.g., a camera, can be equipped with different image sensors including a first image sensor and a second image sensor. For example, the first image sensor may be a visible-light image sensor and can capture a visible-light image, while the second image sensor may be an infrared image sensor and can capture an infrared image. The visible-light image may have a resolution of, e.g., 3840×2160 and an aspect ratio of, e.g., 16:9, while the infrared image may have a resolution of, e.g., 640×512 and an aspect ratio of e.g., 5:4. Sometimes, a user may wish to preview and compare the visible-light image and the infrared image at the same time. To meet this requirement, the visible-light image and the infrared image may be fused to obtain a fused image before being presented to the user by an image presentation apparatus or a terminal device. If the fused image has a resolution equal to a target resolution (e.g., 1280×512) required by the image presentation apparatus, the image acquisition apparatus may encode the fused image into a code stream and send the code steam to the image presentation apparatus or the terminal device. The image presentation apparatus or the terminal device can directly decode the code stream and display the fused image to the user. However, the fused image obtained by simply combing the visible-light image and the infrared image usually does not have a resolution equal to the target resolution, and hence the fused image cannot be presented to the user, resulting in poor user experience.

To solve the above technical problem, the present disclosure provides an image presentation method. FIG. 1 is a flow chat of a method 100 according to some embodiments of the present disclosure. As shown in FIG. 1, the image presentation method 100 includes the following processes.

At 101, a first image captured by a first image sensor and a second image capture by a second image sensor are obtained.

In some embodiments, the first image sensor can be a visible-light image sensor and the second image sensor can be an infrared image sensor. Correspondingly, the first image can be a visible-light image captured by the visible-light image sensor and the second image can be an infrared image captured by the infrared image sensor. In some embodiments, the resolution (e.g., 640×512) of the second image, i.e., the infrared image, may be less than an initial resolution (e.g., 3840×2160) of the first image, i.e., the visible-light image.

In some other embodiments, the first image sensor can be an infrared image sensor and the second image sensor can be a visible-light image sensor. Correspondingly, the first image can be an infrared image captured by the infrared image sensor and the second image can be a visible-light image captured by the visible-light image sensor. In these embodiments, the resolution (e.g., 640×512) of the first image, i.e., the infrared image, may be less than an initial resolution (e.g., 3840×2160) of the second image, i.e., the visible-light image.

In the embodiments described above, the resolution of the infrared image is less than the resolution of the visible-light image. In some other embodiments, the resolution of the infrared image may be the same or higher than the resolution of the visible-light image. The resolutions of the infrared and visible-light images can be determined by properties of the corresponding image sensors and are not limited by the present disclosure.

The first image sensor and the second image sensor may be a same type of image sensor or different types of image sensors. For example, each of the first image sensor and the second image sensor can include a charge coupled device (CCD) image sensor, a complementary metal oxide semiconductor (CMOS) image sensor, or another type of image sensor, which is not limited by the present disclosure. Further, each of the first image sensor and the second image sensor may be a visible-light image sensor, an infrared image senor, or an image sensor configured to sense light within another wavelength range, which is not limited by the present disclosure. For example, the visible-light image sensor can sense light in a visible-light wavelength range (e.g., about 390 nm to about 700 nm) and capture the visible-light image. The infrared image sensor can sense light in an infrared wavelength range (e.g., about 700 nm to about 1 mm) and capture the infrared image. The image sensor configured to sense light within another wavelength range can include, for example, a UV image sensor, which can sense light in a UV wavelength range (e.g., shorter than about 400 nm) and capture a UV image. Accordingly, the first image or the second image may be the visible-light image, the infrared image, the UV image, or an image containing certain colors, which is not limited by the present disclosure.

The first image and the second image can be captured at the same time, or at different times, and can have the same contents. In one example, for the same photographing scene, if the first image and the second image are captured at the same time, the first image and the second image can have the same contents. In another example, for a same stationary photographing scene, even if the first image and second image are not captured at the same time, the first image and the second image can still include the same contents because, e.g., the scene does not change. The first image and the second image may be captured by the same image acquisition apparatus (e.g., a camera), or different image acquisition apparatuses (e.g., different cameras).

A resolution of an image can be determined by a total number of pixels in the image and can also be identified by a number of pixels in a width direction of the image and a number of pixels in a height direction of the image. For example, when the first image is the visible-light image captured by the visible-light image sensor and the second image is the infrared image captured by the infrared image senor, the resolution of the first image may be, e.g., 3840× 2160, and the resolution of the second image may be, e. g., 640×512. The resolutions of the first image and the second image are not limited by the present disclosure.

At 102, the first image is size-processed according to at least one of a target resolution, an aspect ratio of the first image, or an aspect ratio of the second image to generate a size-processed first image having the target resolution.

At 103, a presenting image is generated at least by combining the size-processed first image and the second image. The presenting image has a preset resolution not less than a sum of the target resolution and a resolution of the second image.

In some embodiments, the target resolution may be determined according to at least one of the preset resolution, a presenting ratio between the first image and the second image, or a preset arrangement manner of the size-processed first image and the second image in the presenting image.

The target resolution may be the same as or different from the preset resolution. The preset resolution may be determined by a presenting requirement of an image presenting apparatus, a terminal device, or an image presenting application (APP), etc. For example, after an image captured by an image acquisition apparatus, e.g., a camera, the image acquisition apparatus may convert the image to a code stream, and send the code stream to the image presenting APP. When the image sent by the image acquisition apparatus to the image presenting APP has a resolution equal to the target resolution, e.g., 1280×720, the image presenting APP may be able to directly decode the code stream and present the image to a user. The target resolution may be determined according to actual conditions and is not limited by the present disclosure.

The presenting ratio between the first image and second image can be a proportional relationship between a presenting area corresponding to the first image in the presenting image and a presenting area corresponding to the second image in the presenting image. When the presenting ratio between the first image and the second image equals one, the presenting area corresponding to the first image may be equal to the presenting area corresponding to the second image in the presenting image. When the presenting ratio between the first image and the second image is larger or smaller than one, the presenting area corresponding to the first image is larger or smaller than the presenting area corresponding the second image in the presenting image. The presenting ratio and the preset arrangement manner of the size-processed first image and the second image in the presenting image may be determined according to actual conditions and requirements of the image presenting apparatus and are not limited by the present disclosure.

As described above, how the first image is size-processed may depend on the target resolution, the aspect ratio of the first image, and the aspect ratio of the second image. In some embodiments, the aspect ratio of the first image and the aspect ratio of the second image equal each other, and hence the first image may be size-processed only according to the target resolution. For example, if the resolution of the first image equals the target resolution, the first image can be set, i.e., used, as the size-processed first image. That is, the first image can be set equal to the size-processed first image. If the resolution of the first image is larger than the target resolution, the first image can be zoomed out according to the target resolution. If the resolution of the first image is smaller than the target resolution, the first image can be zoomed in according to the target resolution.

In some embodiments, the aspect ratio of the first image and the aspect ratio of the second image are different from each other, and hence for example the first image can be cropped before size-processing according to the target resolution. In these embodiments, size-processing the first image (102) may include cropping the first image according to the aspect ratio of the first image and/or the aspect ratio of the second image to obtain a cropped first image, and size-processing the cropped first image to generate the size-processed first image.

The aspect ratio of an image refers to a proportional relationship between the width and the height of the image. In some embodiments, the aspect ratio can be determined based on absolute lengths in the width and the height directions of the image. For example, when an image has a width of 16 cm and a height of 9 cm, an aspect ratio of the image can be 16:9. In some embodiments, the aspect ratio can be related to the resolution of the image. For example, the second image, e.g., the infrared image, may have a resolution of 640×512, and hence an aspect ratio of 5:4. As another example, the first image, e.g., the visible-light image, may have a resolution of 3840×2160, and hence an aspect ratio of 16:9.

In some embodiments, when an aspect ratio of the first image is larger than the aspect ratio of the second image, a width of the first image may be cropped, such that an aspect ratio of the cropped first image equals the aspect ratio of the second image. For example, if the first image has an aspect ratio of 16:9 while the second image has an aspect ratio of 5:4, the first image can be cropped in the width direction to have an aspect ratio equal to the aspect ratio (5:4) of the second image. On the other hand, if the aspect ratio of the first image is smaller than the aspect ratio of the second image, the first image can be cropped in the height direction to have an aspect ratio equal to the aspect ratio of the second image.

In some embodiments, both the first image and the second image may include a same object, which may be the main content of the first image and the second image, or the content the user wishes to preview. In these embodiments, cropping the first image can include identifying the object in the first image and cropping the first image according to a position of the object in the first image to generate the cropped first image. The object can be in a region-of-interest (ROI) of the cropped first image. The ROI of the cropped first image can be, for example, a middle region, an upper-left region, an upper-right region, a lower-left region, or a lower-right region of the cropped first image. In some embodiments, the ROI of the cropped first image, i.e., where the object is placed, can be determined based on a user input.

In some embodiments, the first image may include a plurality of objects. In these embodiments, cropping the first image can include identifying the plurality of objects in the first image, selecting one or more objects from the plurality of objects, and cropping the first image according to position(s) of the selected one or more objects in the first image to generate the cropped first image. Similarly, the selected one or more objects can be in the ROI of the cropped first image. In some embodiments, all of the plurality of objects may be selected.

In some embodiments, when the target resolution is equal to a resolution of the cropped first image, the cropped first image can be set, i.e., used, as the size-processed first image. That is, the cropped first image can be set equal to the size-processed first image. When the target resolution is smaller than the resolution of the cropped first image, the cropped first image can be zoomed out according to the target resolution. When the target resolution is larger than the resolution of the cropped first image, the cropped first image can be zoomed in according to the target resolution.

As described above, the size-processed first image and the second image can be combined to generate the presenting image. In some embodiments, the size-processed first image and the second image can be combined according to the preset arrangement manner of the size-processed first image and the second image in the presenting image.

Figure 2:
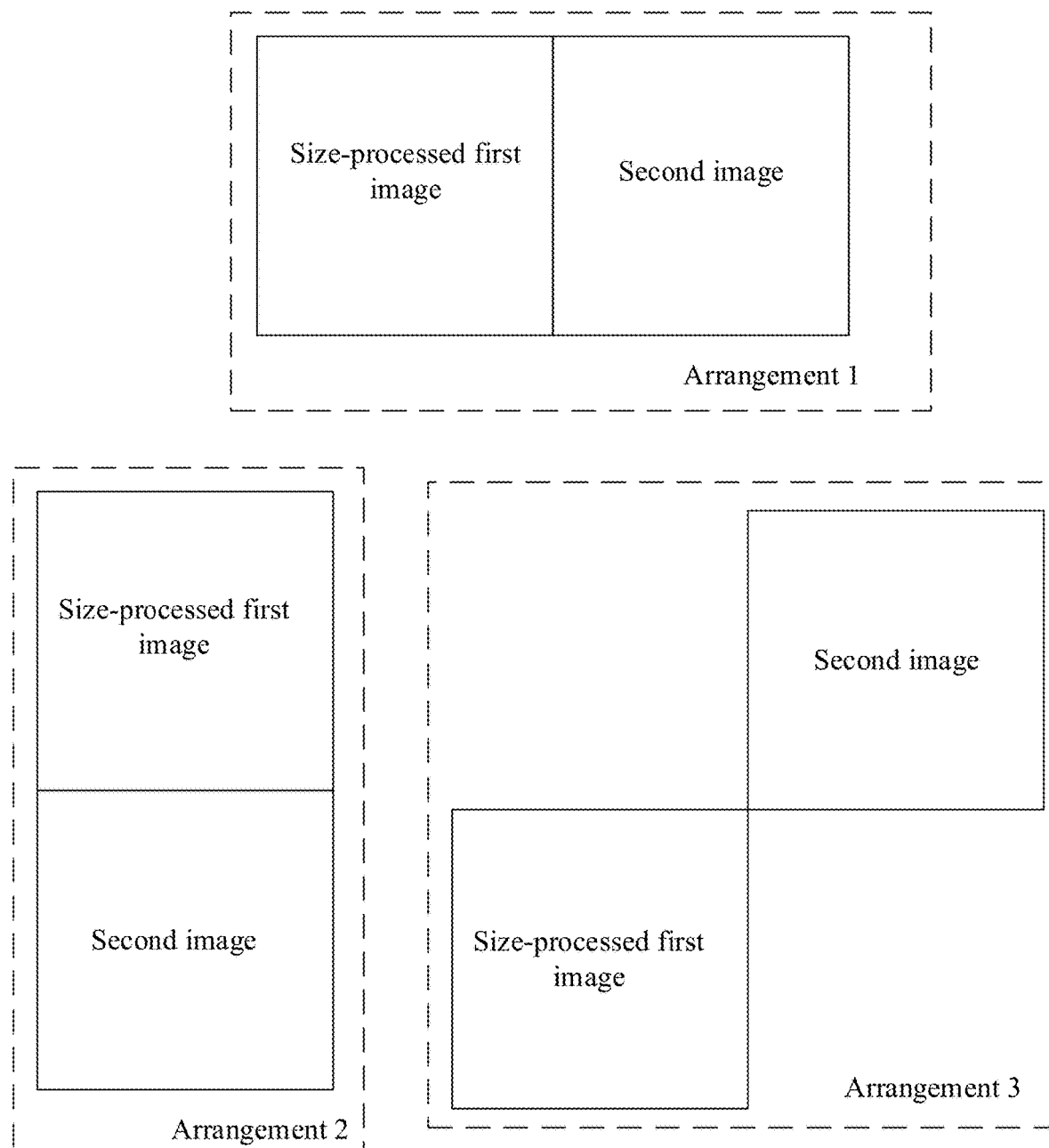
FIG. 2 shows arrangement manners of a first image and a second image in a presenting image according to embodiments of the present disclosure.

FIG. 2 shows example arrangement manners (arrangements 1-3) of the size-processed first image and the second image in the presenting image according to embodiments of the present disclosure. In some embodiments, as shown in FIG. 2, the preset arrangement manner of the size-processed first image and the second image may be aligning the size-processed first image and the second image horizontally. For example, the size-processed first image may be arranged to the left of the second image (arrangement 1 in FIG. 2). In some other embodiments, the size-processed first image may be to the right of the second image. The preset arrangement manner of the size-processed first image and the second image may be aligning the size-processed first image and the second image vertically. For example, the size-processed first image may be arranged above the second image (arrangement 2 in FIG. 2). In some other embodiments, the size-processed first image may be arranged below the second image. The preset arrangement manner of the size-processed first image and the second image may be aligning the size-processed first image and the second image diagonally. For example, the size-processed first image may be arranged to the lower left with respect to the second image (arrangement 3 in FIG. 2). In some other embodiments, the size-processed first image may be arranged to the lower right, upper right, or upper left with respect to the second image, which is nor limited by the present disclosure.

Figure 3:
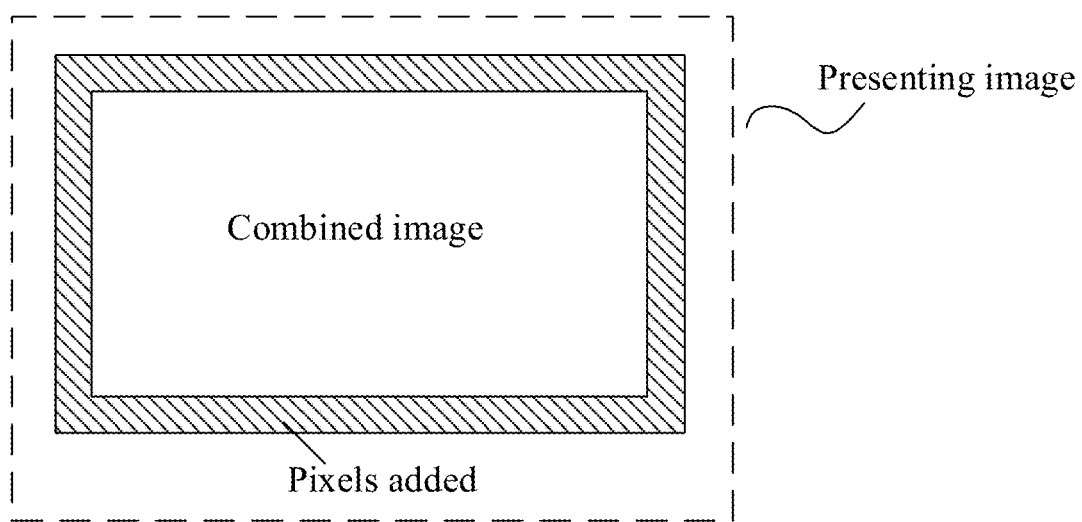
FIG. 3 shows a presenting image generated by adding pixels to a combined image according to some embodiments of the present disclosure.

In some embodiments, the preset resolution may be different from, e.g., larger than, a resolution of the combined image. In these embodiments, a preset number of pixels may be added to the combined image, such that the combined image can have the same resolution as the preset resolution. FIG. 3 schematically shows an example in which pixels (hatched area) are added around the combined image. In some embodiments, pixels may be added to one, two, or three sides of the combined image.

In some embodiments, after the presenting image is generated, the presenting image can be sent to a display device for display. The display device may be, for example, part of the image acquisition apparatus, an independent image presenting apparatus separate from the image acquisition apparatus, or a terminal device with a display function wired or wirelessly connected to the image acquisition apparatus. The display device is configured to display the presenting image, and can be, for example, a light-emitting diode (LED) display, a liquid crystal display (LCD) display, or an organic light-emitting diode (OLED) display, etc.

Using the image presenting method 100 shown in FIG. 1, the first image and the second image can be displayed at the same time to the user. The first image and the second image are displayed independently without partially blocking each other, such that the user is able to clearly review all information included in the first image and the second image, and hence user experience can be improved. This method can be used to fuse not only two images but more than two images. In addition, the method can be applied to fuse multiple images into one image displaying a variety of information with clear comparison, which can facilitate applications in remote sensing detection, environmental protection, safety navigation, traffic monitoring, medical image processing.

Figure 4A:
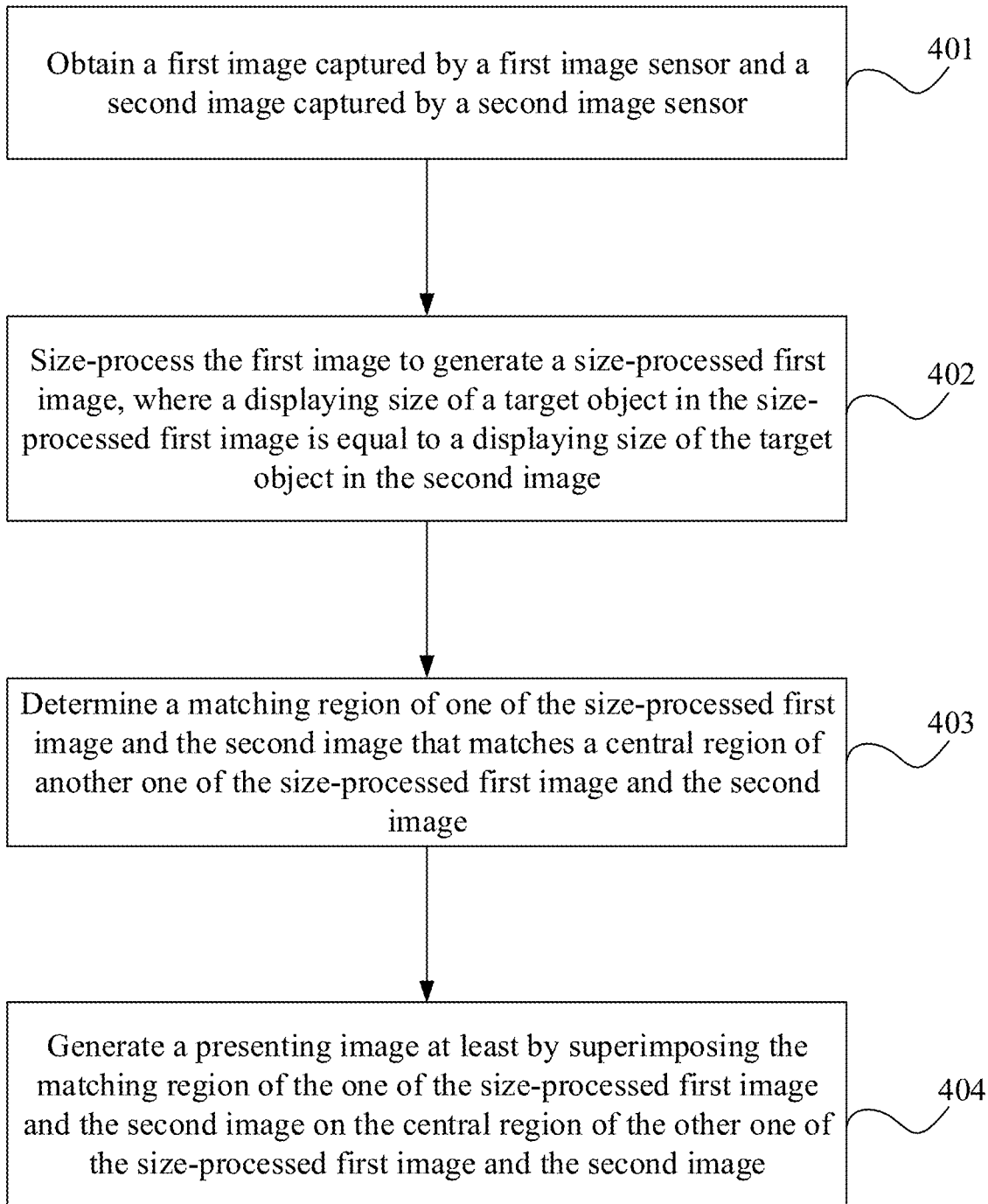
FIG. 4A shows is a flow chat of an image presentation method according to some other embodiments of the present disclosure.

The present disclosure also provides another image presentation method to solve the technical problem. FIG. 4A is a schematic block diagram of an image presentation method 400 according to some other embodiment of the present disclosure. As shown in FIG. 4A, the image presenting method 400 includes the following processes.

At 401, a first image captured by a first image sensor and a second image capture by a second image sensor are obtained. Obtaining the first image and the second image at 401 may be similar to that at 101 described above, and the first image and the second image obtained at 401 may be similar to those obtained at 101 described above, hence detailed description thereof is omitted.

At 402, the first image is size-processed to generate a size-processed first image, such that a displaying size of a target object in the size-processed first image is equal to a displaying size of the target object in the second image.

In some embodiments, a field of view (FOV) of the first image sensor may cover an FOV of the second image sensor, i.e., the FOV of the first image sensor may be larger than or equal to the FOV of the second image sensor. For example, a focal length of a lens corresponding to the first image sensor may be shorter than or equal to a focal length of a lens corresponding to the second image sensor. Therefore, a displaying size of the target object in the first image may be smaller than or equal to the displaying size of the target object in the second image.

In some other embodiments, the FOV of the second image sensor may cover the FOV of the first image sensor, i.e., the FOV of the second image sensor may be larger than or equal to the FOV of the first image sensor. For example, the focal length of the lens corresponding to the second image sensor may be shorter than or equal to the focal length of the lens corresponding to the first image senor. Therefore, the displaying size of the target object in the second image may be smaller than or equal to the displaying size of the target object in the first image.

Figure 4B:
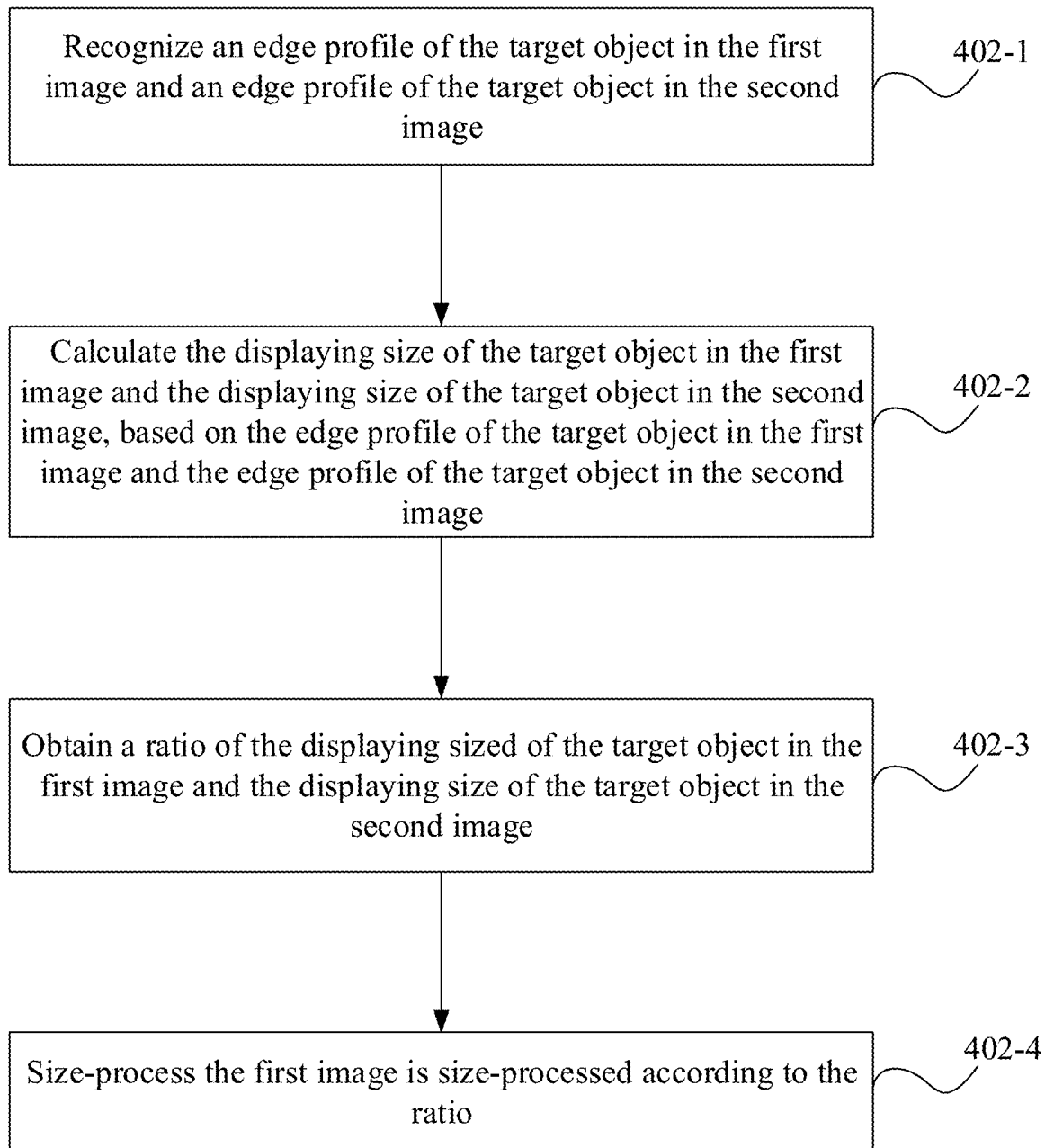
FIG. 4B shows is a flow chat of size-processing the first image of the image presentation method shown in FIG. 4A according to some embodiments of the present disclosure.

In some embodiments, as shown in FIG. 4B, size-processing the first image (402) includes following processes.

At 402-1, an edge profile of the target object in the first image and an edge profile of the target object in the second image are recognized.

At 402-2, based on the edge profile of the target object in the first image and the edge profile of the target object in the second image, the displaying size of the target object in the first image and the displaying size of the target object in the second image are calculated.

At 402-3, a ratio of the displaying sized of the target object in the first image and the displaying size of the target object in the second image is obtained.

At 402-4, the first image is size-processed according to the ratio.

The edge profile may include an outline of the target object. In some embodiments, edge profiles of a plurality of target objects in the first image and the second image may be recognized. In these embodiments, one or more target object may be selected from the plurality of target objects, and edge profiles of the selected one or more target objects in the first image and the second image can be calculated. Based on the edge profiles of the selected one or more target objects in the first image and the edge profile of the target object in the second image, displaying sizes of the selected one or more target objects in the first image and displaying sizes of the target objects in the second image are calculated. In some embodiments, all of the plurality of target objects can be selected to calculate the edge profiles thereof. A quantity of the target object may be determined according to actual conditions and this is not limited by the present disclosure.

The displaying sizes of the target object in the first image and the second image can be determined by calculating based on the edge profiles of the target object in the first image and the second image, respectively. For example, based on the edge profile of the target object, pixels included in the edge profile of the target object can be obtained. Based on the pixels in a horizontal direction and a vertical direction within the edge profiles, the displaying size of the target object can be determined. The present disclosure does not limit the method of obtaining the displaying size of the target object.

The ratio of the displaying size of the target object in the first image and the displaying size of the target object in the second image may be related to a relation between the FOV of the first image sensor and the FOV of the second image sensor, e.g., related to a relation between the focal length of the lens corresponding to the first image sensor and the focal length of the lens corresponding to the second image sensor. If the FOV of the first image sensor is equal to the FOV of the second image sensor, e.g., if the focal length of the lens corresponding to the first image sensor is equal to the focal length of the lens corresponding to the second image sensor, the ratio may be equal to one. If the FOV of the first image sensor is smaller than the FOV of the second image sensor, e.g., if the focal length of the lens corresponding to the first image senor is longer than the focal length of the lens corresponding to the second image sensor, the ratio may be larger than one. If the FOV of the first image sensor is larger than the FOV of the second image sensor, e.g., if the focal length of the lens corresponding to the first image sensor is shorter than the focal length of the lens corresponding to the second image, the ratio may be smaller than one.

In some embodiments, the first image may be size-processed based on the ratio of the displaying size of the target object in the first image and the displaying size of the target object in the second image (402-4). If the ratio is equal to one, the size of the first image may be maintained unchanged. If the ratio is larger than one, the first image may be zoomed out according to the ratio. If the ratio is smaller than one, the first image may be zoomed in according to the ratio.

Referring again to FIG. 4A, at 403, a matching region of one of the size-processed first image and the second image that matches a central region of another one of the size-processed first image and the second image is determined.

In some embodiments, based on the edge profiles obtained at 402-1, the size-processed first image may be aligned with the second image by aligning the edge profile of the target object in the size-processed first image and the edge profile of the target object in the second image, so as to obtain a coordinate mapping relationship between the size-processed first image and the second image. For example, each pixel of the size-processed first image corresponds to a set of coordinates in the size-processed first image, and each pixel of the second image corresponds to a set of coordinates in the second image. By aligning the pixels of the edge profile of the target object in the size-processed first image with the pixels of the edge profile of the target object in the second image, the coordinate mapping relationship can be obtained. The present disclosure dose not limit the method of obtaining the coordinate mapping relationship.

In some embodiments, the matching region may be determined based on the coordinate mapping relationship between the size-processed first image and the second image. The matching region of the size-processed first image and the matching region of the second image may include the target object. The matching region of the size-processed first image and the matching region of the second image may have the same size or different sizes.

At 404, a presenting image is generated at least by superimposing the matching region of the one of the size-processed first image and the second image on the central region of the other one of the size-processed first image and the second image.

Figure 5:
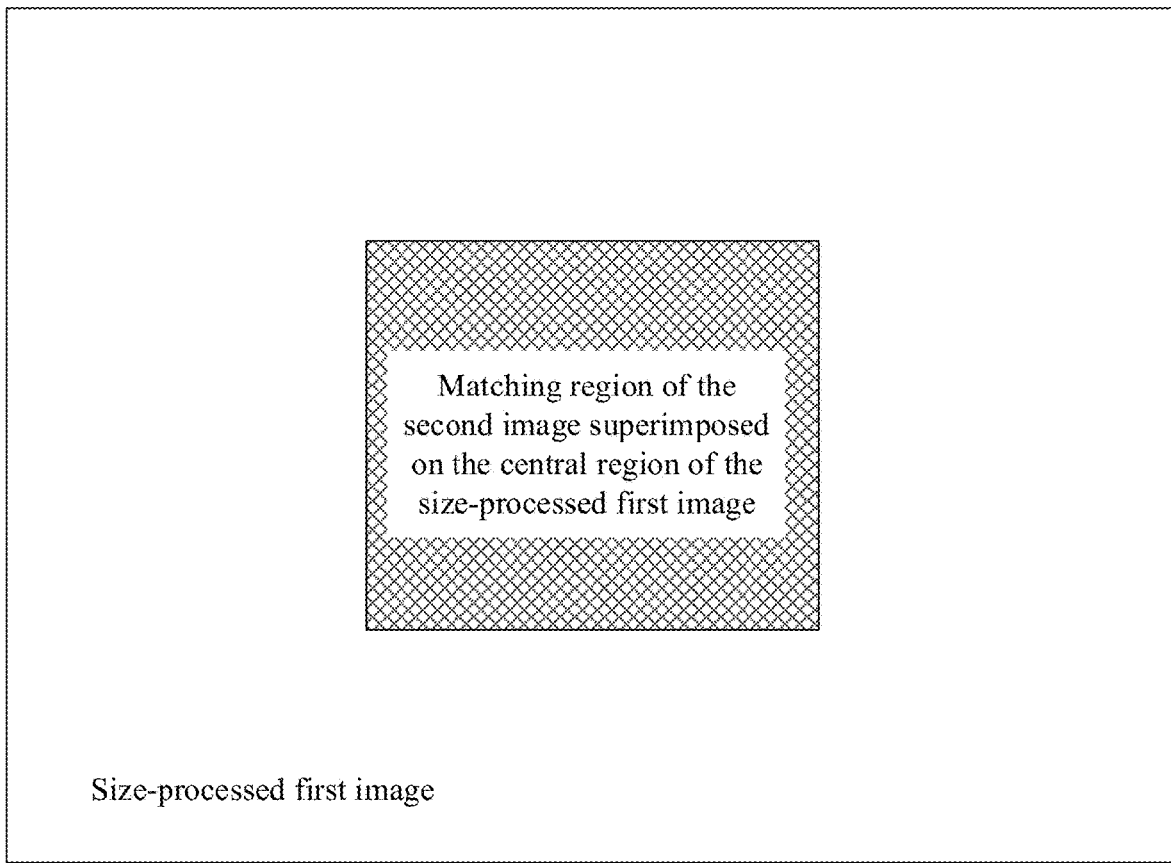
FIG. 5 shows a presenting image generated by superimposing a first image and a second image according to some embodiments of the present disclosure.

FIG. 5 shows an example presenting image generated by superimposing a first image and a second image according to some embodiments of the present disclosure. In some embodiments, as shown in FIG. 5, the presenting image may be generated by superimposing the matching region of the second image on the central region of the size-processed first image. In some other embodiments, the presenting image may be generated by superimposing the matching region of the size-processed first image on the central region of the second image.

In some embodiments, superimposing the matching region on the central region (404) can include setting a transparent factor for the matching region and superimposing the matching region with the transparent factor on the central region. As such, both the matching region of the one of the size-processed first image and the second image and the central region of the other one of the size-processed first image and the second image can be seen at the same time. The transparent factor may be between 0% to 100%, such as 10%, 20%, 30%, 40%, 50%, 60%, 70%, 80%, or 90%, which can be set according to actual condition.

In some embodiments, the matching region is superimposed on the central region to generate a superimposed image. The superimposed image can be zoomed in or out until a resolution of the superimposed image in a vertical direction and/or a horizontal direction is equal to a preset resolution in the corresponding direction. The superimposed image after being zoomed is also referred to as a "zoomed image."

If a resolution of the zoomed image in one direction is larger than a preset resolution for the presenting image in that direction, the zoomed image can be cropped in that direction to generate the presenting image having the preset resolution.

If a resolution of the zoomed image in one direction is smaller than a preset resolution for the presenting image in that direction, certain number of pixels can be added to the zoomed image in that direction to generate the presenting image having the preset resolution.

In some embodiments, the presenting image may be generated by superimposing the matching region of the one of the size-processed first image and the second image on an upper-left, an upper-right, a lower-left, or a lower-right region of the other one of the size-processed first image and the second image.

In some embodiments, after the presenting image is generated, the presenting image can be sent to a display device for display. The display device can be similar to the display device described above, and hence detailed description thereof is omitted.

Using the image presenting method 400 shown in FIG. 4A, the first image and the second image can be displayed at the same time to the user. The first image and second image are superimposed with each other, so as to facilitate the user to compare the first image and the second image, and hence user experience can be improved. This method can be used to fuse not only two images but more than two images. In addition, the method can be applied to fuse multiple images into one image displaying a variety of information with the target object highlighted, which can facilitate applications in remote sensing detection, environmental protection, safety navigation, traffic monitoring, medical image processing.

Figure 6:
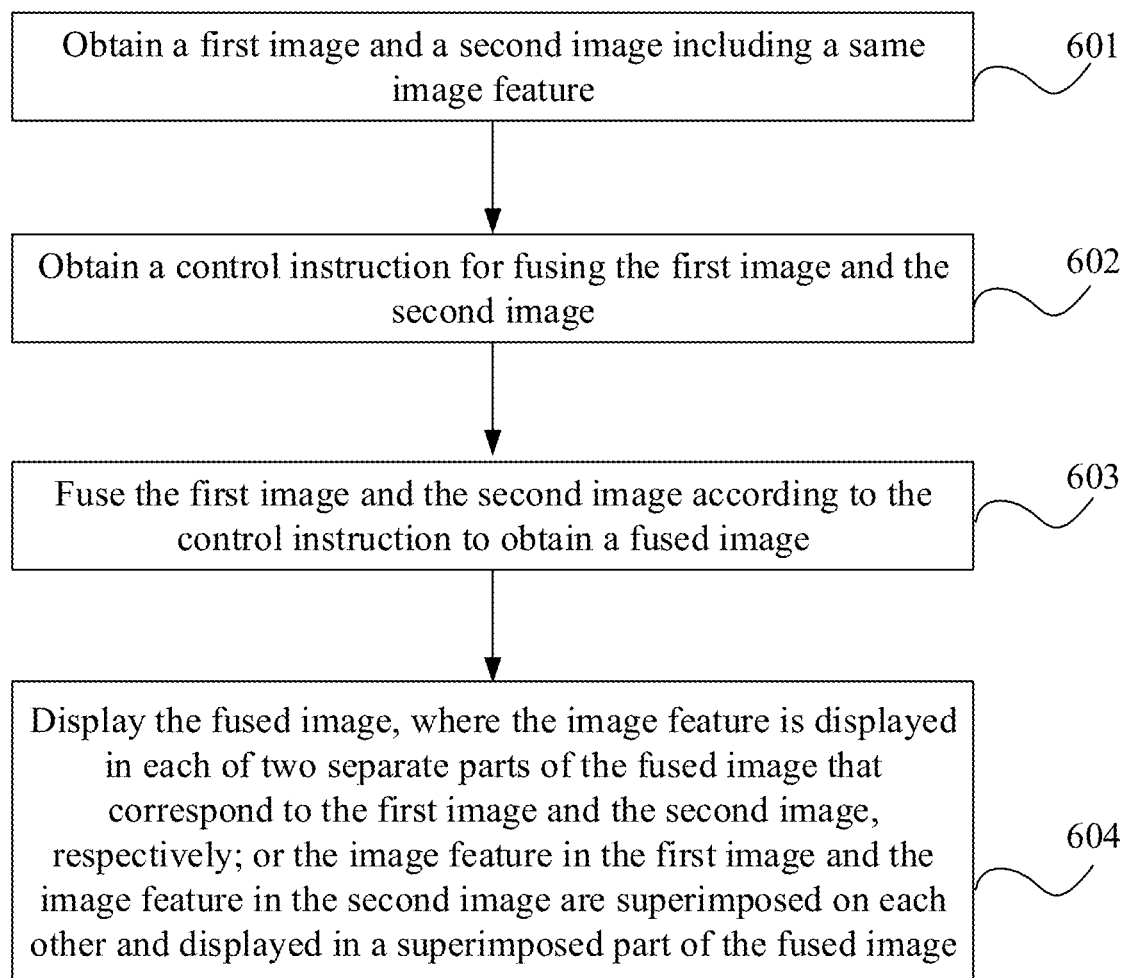
FIG. 6 is a flow chat of an image processing method according to some embodiments of the present disclosure.

Another aspect of the present disclosure further provides an image processing method. FIG. 6 is a flow chat of an image processing method 600 according to some embodiments of the present disclosure. The image processing method 600 can be implemented by an apparatus or a unit of an apparatus with an image processing function. As shown in FIG. 6, the image processing method 600 includes the following processes.

At 601, a first image and a second image are obtained. The first image and the second image include a same image feature.

At 602, a control instruction for fusing the first image and the second image is obtained.

At 603, according to the control instruction, the first image and the second image are fused to obtain a fused image.

At 604, the fused image is displayed.

In some embodiments, the image feature is displayed in each of two separate parts of the fused image that correspond to the first image and the second image, respectively. In some other embodiments, the image feature of the first image and the image feature of the second image are superimposed on each other and displayed in a superimposed part of the fused image. The first image and the second image can be fused according to a method consistent with the disclosure, such as one of the example methods described above. Correspondingly, the image feature can be arranged and displayed in the fused image according to a method consistent with the disclosure, such as one of the example methods described above.

In some other embodiments, the first image sensor can be an infrared image sensor and the second image sensor can be a visible-light image sensor. Correspondingly, the first image can be an infrared image captured by the infrared image sensor and the second image can be a visible-light image captured by the visible-light image sensor. In these embodiments, the resolution (e.g., 640×512) of the first image, i.e., the infrared image, may be less than an initial resolution (e.g., 3840×2160) of the second image, i.e., the visible-light image.

The first image sensor and the second image sensor may be a same type of image sensor or different types of image sensors. For example, each of the first image sensor and the second image sensor can include a charge coupled device (CCD) image sensor, a complementary metal oxide semiconductor (CMOS) image sensor, or another type of image sensor, which is not limited by the present disclosure. Further, each of the first image sensor and the second image sensor may be a visible-light image sensor, an infrared image senor, or an image sensor configured to sense light within another wavelength range, which is not limited by the present disclosure.

The first image and the second image can be captured at the same time, or at different times, and can have the same contents. In one example, for the same photographing scene, if the first image and the second image are captured at the same time, the first image and the second image can have the same contents. In another example, for a same stationary photographing scene, even if the first image and second image are not captured at the same time, the first image and the second image can still include the same contents because, e.g., the scene does not change. The first image and the second image may be captured by the same image acquisition apparatus (e.g., a camera), or different image acquisition apparatuses (e.g., different cameras).

In some embodiments, the image feature may be a target object, a plurality of target objects, or a specific scene, which can be determined according to actual condition and is not limited by the present disclosure.

In some embodiments, the control instruction may be generated in response to an operation of a user, such as a selection operation, an input operation, through a user input/output interface of an apparatus. The user input/output interface may be a display, a touch control display, a keyboard, buttons, or a combination thereof.

Figure 7:
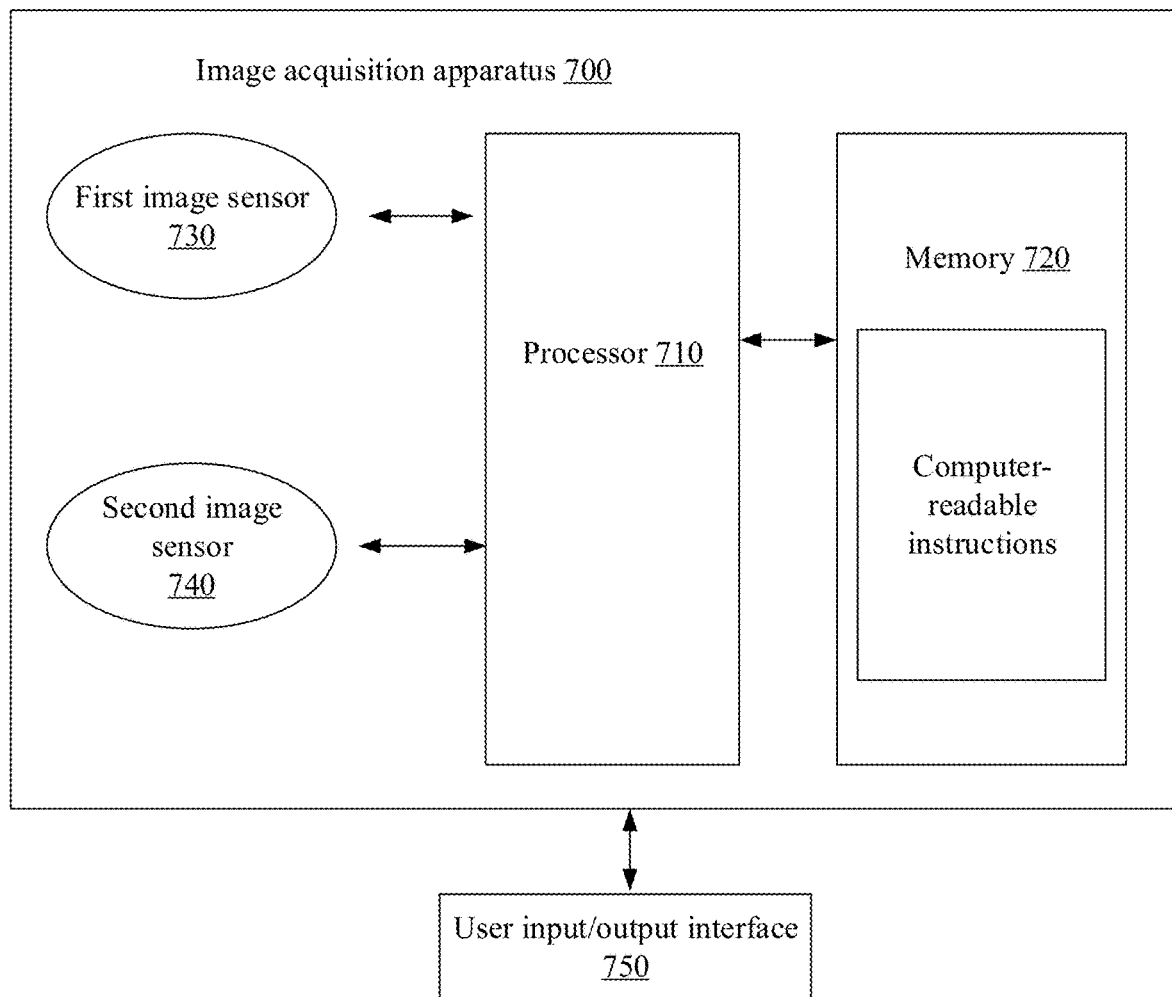
FIG. 7 schematically illustrates an image acquisition apparatus according to some embodiments of the present disclosure.

Another aspect of the present disclosure provides an image acquisition apparatus. FIG. 7 schematically illustrates an image acquisition apparatus 700 according to some embodiments of the present disclosure. The image acquisition apparatus 700 may be a camera, a photographing assembly mounted on an unmanned aerial vehicle, a mobile phone, a tablet, or another apparatus with an image acquisition function. As shown in FIG. 7, the image acquisition apparatus 700 includes one or more of the following components: a processor 710, a memory 720, a first image sensor 730, a second image sensor 740, and a user input/output interface 750.

The processor 710 may be configured to control operations, e.g., photographing, image processing, image displaying, etc., of the image acquisition apparatus 700. The processor 710 is configured to execute computer-readable instructions. In addition, the processor 710 may also include one or more components (not shown) to facilitate interaction between the processor 710 and the first image sensor 730, the second image sensor 740, and the user input/output interface 750.

The memory 720 may store a plurality of computer-readable instructions, images captured by the first image sensor 730 and the second image sensor 740, and other data to support operation of the image acquisition apparatus 700. The memory 720 may be any type of volatile or non-volatile memory or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk.

The first image sensor 730 and the second image sensor 740 may be a same type of image sensor or different types of image sensors. For example, each of the first image sensor 730 and the second image sensor 740 can include a CCD image sensor, a CMOS image sensor, or another type of image sensor, which is not limited by the present disclosure. Further, each of the first image sensor 730 and the second image sensor 740 may be a visible-light image sensor, an infrared image senor, or an image sensor configured to sense light within another wavelength range, which is not limited by the present disclosure. For example, the visible-light image sensor can sense light in a visible-light wavelength range (e.g., about 390 nm to about 700 nm) and capture a visible-light image. The infrared image sensor can sense light in an infrared wavelength range (e.g., about 700 nm to about 1 mm) and capture an infrared image. The image sensor configured to sense light within other wavelength ranges can include, for example, a UV image sensor, which can sense light in a UV wavelength range (e.g., shorter than about 400 nm) and capture a UV image. Accordingly, the first image or the second image may be the visible-light image, the infrared image, the UV image, or an image containing certain colors, which is not limited by the present disclosure.

In some embodiments, the resolution of the second image may be less than an initial resolution of the first image. In some embodiments, the resolution of the second image may be equal to or larger than the initial resolution of the first image.

In some embodiments, an FOV of the first image sensor may cover an FOV of the second image sensor, i.e., the FOV of the first image sensor may be larger than or equal to the FOV of the second image sensor. For example, a focal length of a lens corresponding to the first image sensor may be shorter than or equal to a focal length of a lens corresponding to the second image sensor. Therefore, a displaying size of the target object in the first image may be larger than or equal to the displaying size of the target object in the second image. In some other embodiments, the FOV of the second image sensor may cover the FOV of the first image sensor, i.e., the FOV of the second image sensor may be larger than or equal to the FOV of the first image sensor. For example, the focal length of the lens corresponding to the second image sensor may be shorter than or equal to the focal length of the lens corresponding to the first image senor. Therefore, the displaying size of the target object in the second image may be larger than or equal to the displaying size of the target object in the first image.

The user input/output interface 750 may be a display device, a touch control display device, keyboard, buttons or a combination thereof. For example, if the user input/output interface 750 is a touch control display device. Through a screen, the touch control display device may display images to a user, and by touching touch sensors of the touch control display, the user can input instructions to the image acquisition apparatus 700.

In some embodiments, the computer-readable instructions can be executed by the processor 710 to cause the processor 710 to implement a method consistent with the disclosure, such as the example image presenting method 100 described above in connection with FIG. 1. In some embodiments, the instructions can cause the processor 710 to obtain the first image captured by the first image sensor and the second image captured by the second image sensor, size-process the first image to generate a size-processed first image having the target resolution according to at least one of a target resolution, an aspect ratio of the first image, or an aspect ratio of the second image, generating a presenting image at least by combining the size-processed first image and the second image. A preset resolution of the presenting image is not less than a sum of the target resolution and a resolution of the second image. The target resolution may be determined according to at least one of the preset resolutions, a presenting ratio between the first image and the second image, or a preset arrangement manner of the size-processed first image and the second image in the presenting image.

In some embodiments, the instructions stored in the memory 720 may further cause the processor 710 to crop the first image according to the aspect ratio of the second image to obtain a cropped first image, and size-process the cropped first image according to the target resolution. When an aspect ratio of the first image is larger than the aspect ratio of the second image, a width of the first image may be cropped, such that an aspect ratio of the cropped first image equals the aspect ratio of the second image. On the other hand, if the aspect ratio of the first image is smaller than the aspect ratio of the second image, the first image can be cropped in the height direction to have an aspect ratio equal to the aspect ratio of the second image.

In some embodiments, when the target resolution is equal to a resolution of the cropped first image, the cropped first image can be set, i.e., used, as the resized first image. That is, the cropped first image can be set equal to the resized first image. When the target resolution is smaller than the resolution of the cropped first image, the cropped first image can be zoomed out according to the target resolution. When the target resolution is larger than the resolution of the cropped first image, the cropped first image can be zoomed in according to the target resolution.

In some embodiments, the instructions stored in the memory 720 may further cause the processor 710 to identify an object in the first image, and crop the first image according to a position of the object in the first image to generate the cropped first image that has the object in a ROI of the cropped first image. The ROI of the cropped first image can be, for example, a middle region, an upper-left region, an upper-right region, a lower-left region, or a lower-right region of the cropped first image. In some embodiments, the ROI of the cropped first image, i.e., where the object is placed, can be determined based on a user input via, for example, the user input/output interface 750.

In some embodiments, the instructions stored in the memory 720 may further cause the processor 710 to combine the size-processed first image and the second image to generate a combined image, according to a preset arrangement manner of the size-processed first image and the second image in the presenting image. Referring to FIG. 2, the preset arrangement manner may include aligning the size-processed first image and the second image horizontally, vertically or diagonally to generate the combined image. When the preset resolution being greater than a resolution of the combined image, to generate the presenting image, the instructions stored in the memory 720 may further cause the processor 710 to add pixels having a preset value around the combined image to generate the presenting image.

In some embodiments, the preset resolution may be different from, e.g., larger than, a resolution of the combined image. In these embodiments, referring to FIG. 3, the instructions stored in the memory 720 may further cause the processor 710 to add a preset number of pixels to the combined image, such that the combined image can have the same resolution as the preset resolution. In some embodiments, pixels may be added to one, two, or three sides of the combined image.

In some embodiments, the computer-readable instructions can be executed by the processor 710 to cause the processor 710 to implement a method consistent with the disclosure, such as the example image presenting method 400 described above in connection with FIG. 4A. In some embodiments, the instructions can cause the processor 710 to obtain the first image captured by the first image sensor and the second image captured by the second image sensor, size-process the first image to generate a size-processed first image, determine matching region of one of the size-processed first image and the second image that matches a central region of another one of the size-processed first image and the second image, and generate a presenting image at least by superimposing the matching region of the one of the size-processed first image and the second image on the central region of the other of the size-processed first image and the second image. A displaying size of a target object in the size-processed first image is equal to a displaying size of the target object in the second image.

In some embodiments, the processor 710 may further be configured to recognize an edge profile of the target object in the first image and an edge profile of the target object in the second image. Based on the edge profiles of the target object in the first image and the second image, the displaying sizes of the target object in the first image and the second image can be respectively calculated. In addition, a ratio of the displaying size of the target object in the first image and the displaying size of the target object in the second image can be obtained. Further, the instructions stored in the memory 720 may further cause the processor 710 to size-process the first image according to the ratio. When the ratio is equal to one, the size of the first image may be maintained unchanged. When the ratio is larger or smaller than one, the first image may be zoomed out or in, respectively.

In some embodiments, the instructions stored in the memory 720 may further cause the processor 710 to align the size-processed first image and the second image by aligning the edge profile of the target object in the size-processed first image and the edge profile of the target object in the second image, so as to obtain a coordinate mapping relationship between the size-processed first image and the second image. The matching region may be determined based on the coordinate mapping relationship. In some embodiments, a transparent factor may be set for the matching region.

In some embodiments, the instructions stored in the memory 720 may further cause the processor 710 to generate a superimposed image by superimposing the matching region on the central region. Further, the instructions stored in the memory 720 may further cause the processor 710 to zoom in or out the superimposed image until a resolution of the superimposed image in one of a vertical direction and a horizontal direction is equal to a preset resolution in the corresponding direction to generate a zoomed image. In addition, to generate the presenting image with a preset resolution, a fixed value of pixels may be added around the zoomed image in another one of the vertical direction and the horizontal direction, or the zoomed image may be cropped in the other one of the vertical direction and the horizontal direction.

In some embodiments, a display device, for example, the user input/output interface 750, may display the presenting image.

Using the image acquisition apparatus 700 shown in FIG. 7, the first image and the second image can be displayed at same time to the user. The first image and second image may be displayed independently without partially blocking each other, such that the user is able to clearly review all information included in the first image and the second image, improving user experience. In some embodiments, the first image and second image may be superimposed with each other, so as to facilitate the user to compare the first image and the second image, improving user experience. The image acquisition apparatus can fuse not only two images but more than two images. In addition, the image acquisition apparatus can fuse multiple images into one image displaying a variety of information with clear comparison and highlighting the target object, which can facilitate applications in remote sensing detection, environmental protection, safety navigation, traffic monitoring, medical image processing.

Figure 8:
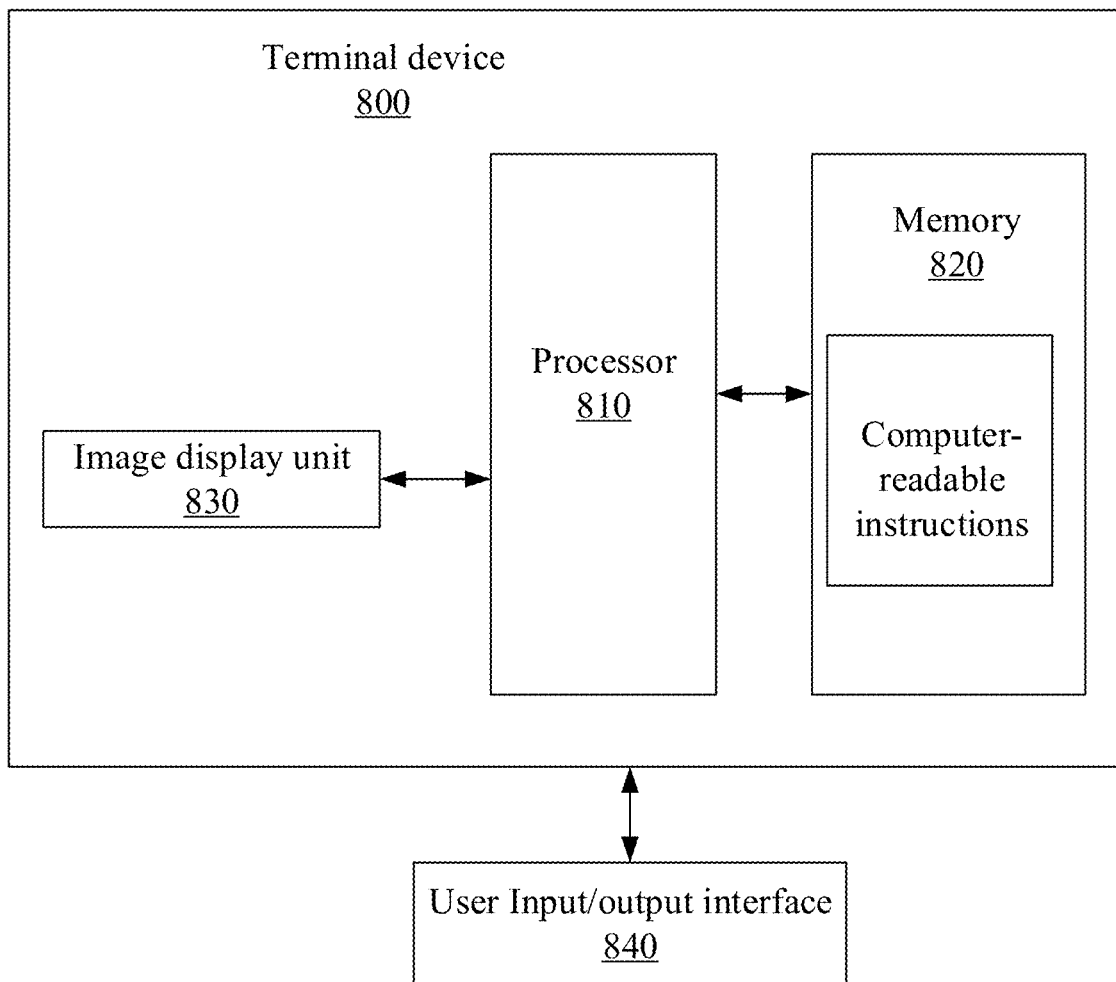
FIG. 8 schematically illustrates a terminal device according to some embodiments of the present disclosure.

Another aspect of the present disclosure provides a terminal device. FIG. 8 schematically illustrates a terminal device 800 according to some embodiments of the present disclosure. The terminal device 800 may be a digital camera, a remote control connected to an unmanned aerial vehicle, a mobile phone, a tablet, a desktop computer, a laptop computer, etc. As shown in FIG. 8, the terminal device 800 includes a processor 810 and a memory 820. The processor 810 can be configured to control operations, e.g., image acquisition, image processing, and image display, etc., of the terminal device 800. The processor 810 is configured to execute computer-readable instructions stored in the memory 820. The memory 820 may store a plurality of computer-readable instructions of the terminal device 800. The memory 820 may be any type of volatile or non-volatile memory or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

In some embodiments, the computer-readable instructions can be executed by the processor 810 to cause the terminal device 800 to implement a method consistent with the disclosure, such as the example image presenting method 100 described above in connection with FIG. 1. In some embodiments, the instruction can cause the processor 810 to obtain the first image captured by the first image sensor and the second image captured by the second image sensor, size-process the first image to generate a size-processed first image having the target resolution according to at least one of a target resolution, an aspect ratio of the first image, or an aspect ratio of the second image, and generate a presenting image at least by combining the size-processed first image and the second image. A preset resolution of the presenting image is not less than a sum of the target resolution and a resolution of the second image. For detailed descriptions of the method, reference can be made to method embodiments consistent with the present disclosure, which are not elaborate here.

In some embodiments, the computer-readable instructions can be executed by the processor 810 to cause the terminal device 800 to implement a method consistent with the disclosure, such as the example image presenting method 400 described above in connection with FIG. 4A. In some embodiments, the instructions can cause the processor 810 to obtain the first image captured by the first image sensor and the second image captured by the second image sensor, size-processing the first image to generate a size-processed first image, determine matching region of one of the size-processed first image and the second image that matches a central region of another one of the size-processed first image and the second image, and generate a presenting image at least by superimposing the matching region of the one of the size-processed first image and the second image on the central region of the other of the size-processed first image and the second image. A displaying size of a target object in the size-processed first image is equal to a displaying size of the target object in the second image. For detailed descriptions of the method, reference can be made to method embodiments consistent with the present disclosure, which are not elaborate here.

In some embodiments, the processor 810 can process images sent from an image acquisition apparatus or a server (not shown). The server may store a plurality of images and saving a local storage space of the terminal device 800.

In some embodiments, as shown in FIG. 8, the terminal device 800 also includes an image display unit 830, configured to display images processed and sent by the processor 810.

In some embodiments, as shown in FIG. 8, the terminal device 800 also includes a user input/output interface 840. The user input/output interface 840 may be a display, a touch control display, a keyboard, buttons or a combination thereof. For example, the user input/output interface 840 can be a touch control display, and through a screen, the user can input instructions input to the terminal device 800.

In addition, the processor 810 may also include one or more components (not shown) to facilitate interaction between the processor 810 and the image acquisition apparatus, the image display unit 830 and the user input/output interface 840.

For detailed description of parts of the terminal device 800, reference can be made to descriptions of the image acquisition apparatus 700, which are not repeated here.

Using the terminal device 800 shown in FIG. 8, the first image and the second image can be displayed at same time to the user. The first image and second image may be displayed independently without partially blocking each other, such that the user is able to clearly review all information included in the first image and the second image, improving user experience. In some embodiments, the first image and second image may be superimposed with each other, so as to facilitate the user to compare the first image and the second image, improving user experience. The terminal device 800 can fuse not only two images but more than two images. In addition, the terminal device 800 can fuse multiple images into one image displaying a variety of information with clear comparison and highlighting the target object, which can facilitate applications in remote sensing detection, environmental protection, safety navigation, traffic monitoring, medical image processing.

Figure 9:
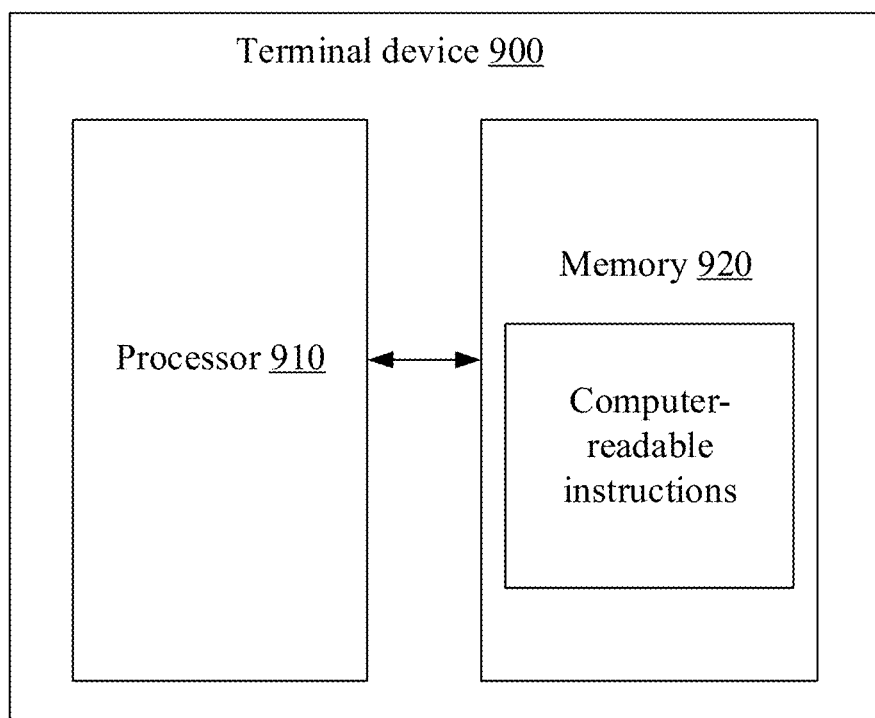
FIG. 9 schematically illustrates a terminal device according to some embodiments of the present disclosure.

Another aspect of the present disclosure provides a terminal device. FIG. 9 schematically illustrates a terminal device 900 according to some embodiments of the present disclosure. The terminal device 900 may be a digital camera, a remote control connected to an unmanned aerial vehicle, a mobile phone, a tablet, a desktop computer, a laptop computer, etc. As shown in FIG. 9, the terminal device 900 includes a processor 910 and a memory 920. The processor 910 can be configured to control operations, e.g., image acquisition, image processing, and image display, etc. of the terminal device 900. The processor 910 is configured to execute computer-readable instructions stored in the memory 920. The memory 920 may store a plurality of computer-readable instructions of the terminal device 900. The memory 920 may be any type of volatile or non-volatile memory or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

In some embodiments, the computer-readable instructions can be executed by the processor 910 to cause the processor 910 to implement a method consistent with the disclosure, such as the example image processing method 600 described above in connection with FIG. 6. In some embodiments, the instructions can cause the processor 910 to obtain the first image and the second image including a same image feature, obtain a control instruction for fusing the first image and the second image, fuse the first image and the second image according to the control instruction to obtain a fused image, and displaying the fused image. In some embodiments, the image feature is displayed in each of two separate parts of the fused image that correspond to the first image and the second image, respectively. In some other embodiments, the image feature in the first image and the image feature in the second image are superimposed on each other and displayed in a superimposed part of the fused image. For detailed descriptions of the method, reference can be made to method embodiments consistent with the present disclosure, which are not elaborate here.

For detailed description of parts of the terminal device 900, reference can be made to descriptions of the image acquisition apparatus 700, which are not repeated here.

Figure 10A:
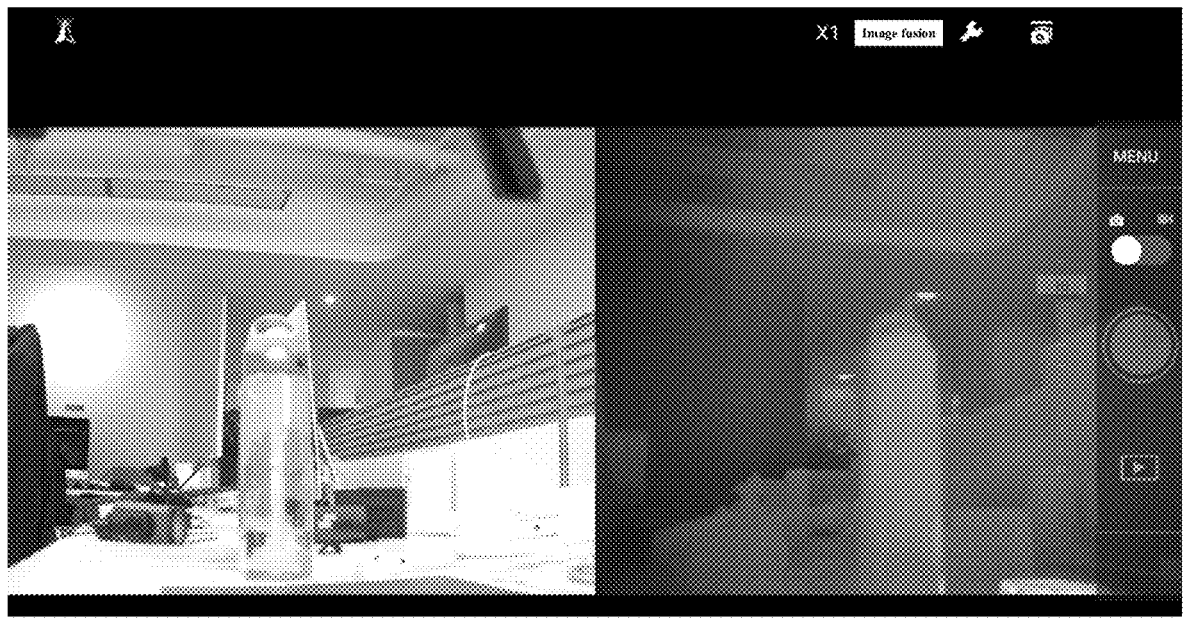
FIG. 10A and FIG. 10B show example presenting images displayed by a user interface (UI).
Figure 10B:

FIG. 10A and FIG. 10B show example presenting images displayed by a user interface (UI). The UI may be a user input/output interface of, for example, an image acquisition apparatus or a terminal device, etc. As shown in FIG. 10A and FIG. 10B, through the UI, the user can acquire images by, for example clicking a round button (e.g. a home button of a cell phone) on the right. In addition, the user can choose a photographing mode from, for example, taking photos and taking videos. The user can set up parameters through a setting menu, which can be displayed to the user when the user clicks a setting button, for example, a button with a wrench shape on the upper right of the FIG. 10A and FIG. 10B. A visible-light image can be the first image (on the left of FIG. 10A), and an infrared image can be the second image (on the right of FIG. 10A). The parameters may include how the image feature in the first image and the second image are displayed in the fused image. The image feature may be a target object included in the first and the second images, e.g., a bottle as shown in FIG. 10A. The image feature may be a matching region of the first and the second images, e.g., a photographing scene including the bottle as shown in FIG. 10B.

FIG. 10A shows an example presenting image generated by displaying the image feature in each of two separate parts of the fused image that correspond to the first image and the second image, respectively according to embodiments of the present disclosure. For example, the part of the first image and the part of the second image are arranged in parallel. The image feature (e.g., the bottle) of the first image and the image feature (e.g., the bottle) of the second image are presented separately in the presenting image without blocking each other.

FIG. 10B shows another example presenting image generated by superimposing the image feature in the first image and the image feature in the second image on each other and displaying in a superimposed part of the fused image according to embodiments of the present disclosure. For example, the matching region of the second image are superimposed with the central region of the first image.

For simplification purposes, detailed descriptions of the operations of apparatus, device, and units may be omitted, and references can be made to the descriptions of the methods.

The disclosed apparatuses, device, and methods may be implemented in other manners not described here. For example, the devices described above are merely illustrative. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random-access memory (RAM), a magnetic disk, or an optical disk.

Other embodiments of the disclosure will be apparent to those skilled in the art from consideration of the specification and practice of the embodiments disclosed herein. It is intended that the specification and embodiments be considered as examples only and not to limit the scope of the disclosure. Any modification and equivalently replacement for the technical solution of the present disclosure should all fall in the spirit and scope of the technical solution of the present disclosure.

What is claimed is:

1. An image presentation method comprising:
   obtaining a first image captured by a first image sensor and a second image captured by a second image sensor, the first image and the second image including same contents, one of the first image and the second image being a visible-light image, and another one of the first image and the second image being an infrared image;
   size-processing the first image according to at least one of a target resolution, an aspect ratio of the first image, or an aspect ratio of the second image to generate a size-processed first image having the target resolution, wherein size-processing the first image includes:
      cropping the first image according to the aspect ratio of the second image to obtain a cropped first image; and
      size-processing the cropped first image according to the target resolution;
   generating a presenting image at least by combining the size-processed first image and the second image, the presenting image having a preset resolution that is not less than a sum of the target resolution and a resolution of the second image, the preset resolution being a resolution required by a display device, and the size-processed first image and the second image being arranged in the presenting image without partially blocking each other; and encoding the presenting image in a code stream and transmitting the encoded presenting image to the display device.

2. The method of claim 1, wherein obtaining the first image captured by the first image sensor and the second image captured by the second image sensor includes:
obtaining the visible-light image captured by a visible-light image sensor, the visible-light image being the first image; and
obtaining the infrared image captured by an infrared image sensor, the infrared image being the second image.

3. The method of claim 2, wherein:
the resolution of the second image is less than an initial resolution of the first image before being size-processed.

4. The method of claim 1, wherein obtaining the first image captured by the first image sensor and the second image captured by the second image sensor includes:
obtaining the visible-light image captured by a visible-light image sensor, the visible-light image being the second image; and
obtaining the infrared image captured by an infrared image sensor, the infrared image being the first image.

5. The method of claim 1, further comprising:
determining the target resolution according to at least one of the preset resolution, a presenting ratio between the first image and the second image, or a preset arrangement manner of the size-processed first image and the second image in the presenting image.

6. The method of claim 1, wherein cropping the first image according to the aspect ratio of the second image includes:
cropping a width of the first image to cause an aspect ratio of the cropped first image to be equal to the aspect ratio of the second image, in response to the aspect ratio of the first image being larger than the aspect ratio of the second image; and
cropping a length of the first image to cause the aspect ratio of the cropped first image to be equal to the aspect ratio of the second image, in response to the aspect ratio of the first image being less than the aspect ratio of the second image.

7. The method of claim 1, wherein size-processing the cropped first image according to the target resolution includes:
setting the cropped first image to be the size-processed first image, in response to the target resolution being equal to a resolution of the cropped first image;
zooming out the cropped first image according to the target resolution, in response to the target resolution being smaller than the resolution of the cropped first image; and
zooming in the cropped first image according to the target resolution, in response to the target resolution being greater than the resolution of the cropped first image.

8. The method of claim 1, wherein cropping the first image according to the aspect ratio of the second image includes:
identifying an object in the first image, the same contents including the object; and
cropping the first image according to a position of the object in the first image to generate the cropped first image.

9. The method of claim 8, further comprising:
determining a region-of-interest (ROI) for the cropped first image;
wherein cropping the first image according to the position of the object the first image to generate the cropped first image includes:
cropping the first image according to the position of the object in the first image to generate the cropped first image that has the object in the ROI of the cropped first image.

10. The method of claim 9, wherein determining the ROI for the cropped first image includes:
determining the ROI for the cropped first image based on a user input.

11. The method of claim 1, wherein generating the presenting image includes:
combining the size-processed first image and the second image to generate a combined image, according to a preset arrangement manner of the size-processed first image and the second image in the presenting image.

12. The method of claim 11, wherein generating the presenting image includes:
combining the size-processed first image and the second image by aligning the size-processed first image and the second image horizontally, vertically, or diagonally to generate the combined image.

13. The method of claim 11, wherein generating the presenting image further includes:
adding pixels having a preset value around the combined image to generate the presenting image, in response to the preset resolution being greater than a resolution of the combined image.

14. The method of claim 13, wherein adding pixels having the preset value around the combined image includes:
adding the pixels to one or more sides of the combined image.

15. The method of claim 1, wherein:
the first image and the second image are captured at a same time.

16. An image acquisition apparatus comprising:
a first image sensor configured to capture a first image, the first image sensor being a visible-light image sensor and the first image being a visible-light image;
a second image sensor configured to capture a second image, the first image and the second image including same contents, the second image sensor being an infrared image sensor and the second image being an infrared image;
a processor coupled to the first image sensor and the second image sensor; and
a memory coupled to the processor and storing instructions that, when executed by the processor, cause the processor to:
obtain the first image and the second image;
size-process the first image according to at least one of a target resolution, an aspect ratio of the first image, or an aspect ratio of the second image to generate a size-processed first image having the target resolution, and the resolution of the second image being less than an initial resolution of the first image before being size-processed;
generate a presenting image at least by combining the size-processed first image and the second image, the presenting image having a preset resolution that is not less than a sum of the target resolution and a resolution of the second image, the preset resolution being a resolution required by a display device, and the size-processed first image and the second image being arranged in the presenting image without partially blocking each other; and encode the presenting image in a code stream and transmit the encoded presenting image to the display device.

17. A terminal device comprising:

a processor; and a memory coupled to the processor and storing instructions that, when executed by the processor, cause the processor to:

obtain a first image captured by a first image sensor and a second image captured by a second image sensor, the first image and the second image including same contents, one of the first image and the second image being a visible-light image, and another one of the first image and the second image being an infrared image;

size-process the first image according to at least one of a target resolution, an aspect ratio of the first image, or an aspect ratio of the second image to generate a size-processed first image having the target resolution, wherein size-processing the first image includes:

cropping the first image according to the aspect ratio of the second image to obtain a cropped first image; and size-processing the cropped first image according to the target resolution;

generate a presenting image at least by combining the size-processed first image and the second image, the presenting image having a preset resolution that is not less than a sum of the target resolution and a resolution of the second image, the preset resolution being a resolution required by a display device, and the size-processed first image and the second image being arranged in the presenting image without partially blocking each other; and encode the presenting image in a code stream and transmit the encoded presenting image to the display device.

18. The terminal device of claim 17, wherein the processor is further configured to:

determine the target resolution according to at least one of the preset resolution, a presenting ratio between the first image and the second image, or a preset arrangement manner of the size-processed first image and the second image in the presenting image.

* * * * *